July 10, 1934.  C. J. HUGHEY  1,966,347
SELF THREADING FILM MAGAZINE
Filed Aug. 2, 1930
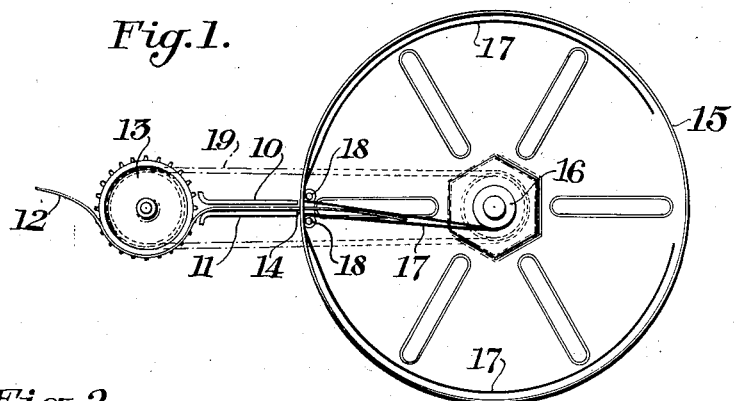
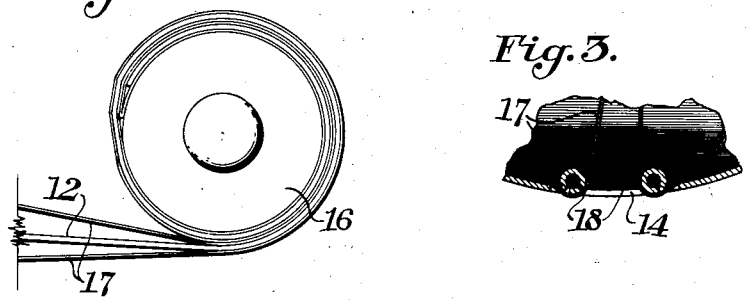
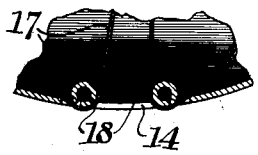
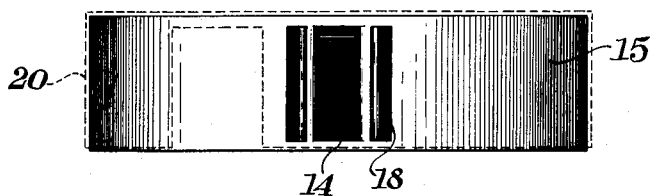
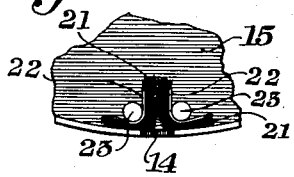
Inventor,
Carter J. Hughey;
By Newton M. Perrin
Attorneys.

Patented July 10, 1934

1,966,347

UNITED STATES PATENT OFFICE 1,966,347

SELF-THREADING FILM MAGAZINE

Carter J. Hughey, Rochester, N. Y., assignor to Eastman Kodak Company, Rochester, N. Y., a corporation of New York Application August 2, 1930, Serial No. 472,667

9 Claims. (Cl. 242—74)

My invention relates to motion picture apparatus and particularly to film magazines therefor designed to afford means which are simple, substantial and effective whereby the end of the film may be quickly and conveniently threaded on and secured to the core of the magazine without opening it.

It is an object of my invention to provide an automatic guide means that will deliver the film to the magazine core and means that will automatically engage the film for the purpose of winding the film on the core.

Another object of my invention is to provide, in connection with the core, binding strips which are used in starting to wind the film upon the core. These strips are secured at one of their ends to the core and depend therefrom. The film is fed between the strips and the core rotated, causing the strips to bind upon the film and permits tension to be applied to the film to wind it without any slipping.

Other objects and advantages of my invention will appear in the following description when taking in connection with the accompanying drawing in which,—

Fig. 1 is a side elevation of my self-threading magazine with feeding means therefor;

Fig. 2 is an enlarged view of the core of the magazine with a film started to wind thereon;

Fig. 3 is a partial view showing the arrangement of the film engaging means at the opening of the magazine;

Fig. 4 shows a modification of the film opening; and

Fig. 5 is a view of a film magazine with a light shield suggested in broken lines.

To carry out the objects of my invention I provide a double film guide 10 and 11 to receive the film 12 from the usual feed sprocket 13 and deliver it to the film slit 14 provided in the magazine 15. The magazine 15 has a wooden core 16 to which is attached two flexible strips 17 adapted to pass over two rollers or guides 18 and back along the inside wall of the magazine as shown. The rollers 18 are positioned on each side of the film slit 14 so that the end of the film 12 will be delivered through the slit 14 and between the flexible strips 17 by the guides 10 and 11.

When the sprocket 13 and the core 16 are driven simultaneously by any suitable means 19 indicated in broken lines, the guides 10 and 11 deliver the end of the film 12 between the strips 17 which guide it to the core 16 where one complete revolution of the core causes the strips to wind with the film, and the strips being secured to the core bind the end of the film closely to the core, thus permitting tension to be applied to the film to wind it without any slipping on the core. As the film 12 is now secured to the core 15 the guide strips are no longer needed and they will be wound up with the film for a few convolutions.

The strips 17 may be of any suitable material flexible enough to wind up with the film, and I have found that heavy paper, discarded film or fabric will function very satisfactorily.

When it is desired to develop the portion of the film already wound on the core without waiting until the whole film has been exposed, the film is severed in any suitable manner well known in the art between the ends of the film guide and the slit 14 and the magazine is removed and made light tight in any suitable manner as by covering the slit 14 with the casing 20 shown in broken lines in Figure 5. Another magazine with its flexible strips 17 in the position shown in Figure 1 is now placed in position and upon driving the feed sprocket 13 and the core 6 the film is again fed to and secured to the core as above described.

The rollers or guides 18 may be separate members properly mounted in the magazine or they may be formed integral with the magazine, as shown in Figures 3 and 5, by turning upon themselves the sections partially cut out to form the slit 14.

The film magazine above described, when in use, has an uncovered film opening and is designed to be used in apparatus of a type constructed to exclude all light or to use some suitably backed film.

When it is desired to use my invention in other types of apparatus the magazine may be provided with an opening 14 rendered substantially light tight in some manner, such as shown in Figure 4, by mounting two pieces of velvet or similar material 21 upon the angular members 22 which are supported in position on either side of the opening 14 by the pins 23 anchored in the side of the magazine. The angular members 22 are so positioned that the pile of the pieces 21 contacts with both sides of the opening 14 and with one another over the center of the opening 14, the pile being flexible to permit entrance or passage therebetween of the strips 17 and the film 12.

While I have illustrated and described one embodiment of my invention, I do not desire to be limited thereby as many modifications and changes will occur to those skilled in the art without departing from the scope and spirit of my invention, the scope of which will be pointed out in the appended claims.

What I claim as new and desire to secure by Letters Patent of the United States is:

1. The combination with a film magazine having a core and film opening, a film, flexible means adapted to cooperate with both sides of the film for guiding said film upon the core, said flexible means cooperating with said core to hold said film in position for winding.

2. The method of attaching a film to a core of a closed film magazine having an opening therein which comprises feeding the end of the film through said opening and between two strips of flexible material secured to the core and rotating said core to guide the film to the core and to wind the film and strips thereon whereby the strips bind the film to said core.

3. A self-threading film magazine for motion picture apparatus having an opening and including a rotatable core, two strips of flexible material each having one end secured to said core, leaving the other end free, said strips being trained over opposite edges of the film opening, whereby a film may be fed inwardly through said opening and between said strips and said strips may be wound with said film upon rotation of said core.

4. A self-threading magazine for a band of material comprising a frame, a core mounted to rotate in the frame, two strips of flexible material each having one end secured to the core, leaving the other end free, whereby upon insertion of the end of a band between said strips, the band may be wound therewith upon the core.

5. A self-threading magazine for a band of material comprising a frame, a core mounted to rotate in the frame, said frame having a film guiding way, two strips of flexible material each attached at one end to the core and having its other end extending to the way, whereby upon insertion of the end of a band through said way and between the strips it may be guided thereby to the core and may be wound with the strips upon the core.

6. A self-threading spool for a photographic film band comprising a core and two flexible strips free from projections each attached at one end to the core and having its other end free, whereby upon insertion of the end of a band between said strips and turning of the core the band will be gripped by friction alone between the strips and wound therewith upon the core.

7. A core for winding a band of flexible material comprising a cylindrical body, and a sheet wrapped upon said core centrally of the sheet and providing a pair of band engaging flaps adapted to receive the end of a band to be wound therebetween for anchoring it to the body.

8. A winding core for a band of flexible material comprising a cylindrical body portion, and a pair of overlapping flaps of flexible web-like material secured at one end to said body portion so that a band may be disposed between the flaps and the roll and wound up therewith.

9. A winding core provided with a pair of web engaging flaps of flexible web-like material adapted to receive the inner end of a web therebetween for anchoring it to the core when the web is wound thereon.

CARTER J. HUGHEY.